US012172316B2

(12) United States Patent
DeStories et al.

(10) Patent No.: US 12,172,316 B2
(45) Date of Patent: Dec. 24, 2024

(54) ROBOTIC SYSTEM FOR INSPECTING A PART AND ASSOCIATED METHODS

(71) Applicant: The Boeing Company, Chicago, IL (US)

(72) Inventors: Jason G. DeStories, Mesa, AZ (US); Michael R. Mercer, Mesa, AZ (US); Jeffery Peebles, Mesa, AZ (US); Patrick C. Scofield, Mesa, AZ (US); Basilio Penuelas, Mesa, AZ (US)

(73) Assignee: The Boeing Company, Arlington, VA (US)

( * ) Notice: Subject to any disclaimer, the term of this patent is extended or adjusted under 35 U.S.C. 154(b) by 183 days.

(21) Appl. No.: 17/523,382

(22) Filed: Nov. 10, 2021

(65) Prior Publication Data

US 2023/0146712 A1 May 11, 2023

(51) Int. Cl.
*B25J 9/16* (2006.01)
*B25J 11/00* (2006.01)
*B25J 13/08* (2006.01)

(52) U.S. Cl.
CPC ........... *B25J 9/1664* (2013.01); *B25J 9/1653* (2013.01); *B25J 9/1697* (2013.01); *B25J 11/0055* (2013.01); *B25J 13/086* (2013.01); *B25J 13/089* (2013.01)

(58) Field of Classification Search
CPC ...... B25J 9/1664; B25J 9/1653; B25J 9/1697; B25J 11/0055; B25J 13/086; B25J 13/089
See application file for complete search history.

(56) References Cited

U.S. PATENT DOCUMENTS

| | | | | |
|---|---|---|---|---|
| 4,718,023 | A * | 1/1988 | Arora | B25J 9/1692 73/625 |
| 9,710,919 | B2 | 7/2017 | Teng et al. | |
| 9,841,503 | B2 | 12/2017 | Olsson et al. | |

(Continued)

OTHER PUBLICATIONS

V. Prabakaran et al., "Hornbill: A Self-Evaluating Hydro-Blasting Reconfigurable Robot for Ship Hull Maintenance," in IEEE Access, vol. 8, p. 193790-193800, 2020, doi: 10.1109/ACCESS.2020.3033290. (Year: 2020).*

(Continued)

*Primary Examiner* — Adam R Mott
*Assistant Examiner* — Matthew C Gammon
(74) *Attorney, Agent, or Firm* — Kunzler Bean & Adamson

(57) ABSTRACT

A robotic system for inspecting a part comprises a robot comprising an articulating arm and an end effector, coupled to the articulating arm. The robotic system further includes three or more proximity sensors on the end effector and spaced apart from each other. Each of the proximity sensors is configured to detect a measured distance from the proximity sensor to a surface, such that the end effector is displaced from the surface. The robotic system includes a controller configured to receive measured distances from the proximity sensors. The controller is also configured to orient the end effector to a predetermined orientation based on the measured distances. The controller is further configured to calculate an average of the measured distances. Additionally, the controller is configured to move the end effector to a predetermined operating distance from the surface based on the average of the measured distance.

20 Claims, 7 Drawing Sheets

(56) References Cited

U.S. PATENT DOCUMENTS

| | | | | |
|---|---|---|---|---|
| 2011/0014371 A1* | 1/2011 | Herre | B05B 12/149 | 901/50 |
| 2014/0067185 A1* | 3/2014 | Tralshawala | G01N 27/90 | 378/58 |
| 2015/0306763 A1* | 10/2015 | Meier | G05B 19/42 | 901/3 |
| 2017/0095932 A1* | 4/2017 | Murakami | B25J 13/085 | |
| 2022/0281032 A1* | 9/2022 | Boselli | B23K 37/0211 | |

OTHER PUBLICATIONS

J. Sanz, M. Ferre, A. Espada, M. C. Narocki and J. Fernández-Pardo, "Robotized inspection system of the external aircraft fuselage based on ultrasound," 2010 IEEE/RSJ International Conference on Intelligent Robots and Systems, Taipei, Taiwan, 2010, pp. 2612-2617, doi: 10.1109/IROS.2010.5653073. (Year: 2010).*

V. Prabakaran et al., "Hornbill: A Self-Evaluating Hydro-Blasting Reconfigurable Robot for Ship Hull Maintenance, " in IEEE Access, vol. 8, pp. 193790-193800, 2020, doi: 10.1109/ACCESS.2020.3033290. (Year: 2020).*

S. Christmann, I. Busboom, V. K. S. Feige and H. Haehnel, "Towards Automated Quality Inspection Using a Semi-Mobile Robotized Terahertz System," 2020 Third International Workshop on Mobile Terahertz Systems (IWMTS), Essen, Germany, 2020, pp. 1-5, doi: 10.1109/IWMTS49292.2020.9166259. (Year: 2020).*

Yuan, Peijiang, et al. "Surface normal measurement in the end effector of a drilling robot for aviation." 2014 IEEE international conference on robotics and automation (ICRA). IEEE, 2014. (Year: 2014).*

YouTube video, 1000W Rust Cleaning Laser—Removes Rust Effortlessly, https://www.youtube.com/watch?/=ACGSzBXKONo accessed Nov. 10, 2021.

Robotiq Sanding Kit, https://robotiq.com/products/sanding-kit?ref=nav_product_new_button accessed Nov. 10, 2021.

* cited by examiner

ROBOTIC SYSTEM FOR INSPECTING A PART AND ASSOCIATED METHODS

FIELD

This disclosure relates generally to a robotic system for inspecting a part, and more particularly to a robotic system for inspecting a part without contacting the surface of the part.

BACKGROUND

Parts of large structures, such as aircraft and other vehicles, can require inspections, such as for wear or damage or to measure material properties of the parts. A visual or manual inspection can be difficult to achieve due to the size and/or the shape of the part or the overall structure. For parts with hard-to-inspect areas, some robots are programmed to position an inspection device in contact with a surface of the part and, when in contact, move the inspection device along the surface by following probes or other guides fixed on the surface. However, robots programmed to place inspection devices in contact with the surface of parts are prone to causing inadvertent damage to the part, particularly when the surface of the part is difficult to access or has a complex shape. Furthermore, in some situations, such as due to constraints associated with the size and/or shape of the part or overall structure, contacting the surface of the structure can be difficult, if not impossible.

SUMMARY

The subject matter of the present application provides examples of a robotic system for inspecting a part and associated methods that overcome the above-discussed shortcomings of prior art techniques. The subject matter of the present application has been developed in response to the present state of the art, and in particular, in response to shortcomings of conventional systems.

Disclosed herein is a robotic system for inspecting a part. The robotic system comprises a robot comprising an articulating arm and an end effector, coupled to the articulating arm. The robotic system further includes three or more proximity sensors on the end effector and spaced apart from each other. Each one of the three or more proximity sensors is configured to detect a measured distance from the proximity sensor to a surface, such that the end effector is continuously displaced from the surface. The robotic system also includes a controller. The controller is configured to receive measured distances from the three or more proximity sensors. The controller is also configured to orient the end effector to a predetermined orientation based on the measured distances. The controller is further configured to, after orienting the end effector to the predetermined orientation, calculate an average of the measured distances. Additionally, the controller is configured to move the end effector to a predetermined operating distance from the surface based on the average of the measured distance. The preceding subject matter of this paragraph characterizes example 1 of the present disclosure.

The controller is further configured to orient the end effector to a perpendicular orientation, normal to the surface, based on the measured distances. The preceding subject matter of this paragraph characterizes example 2 of the present disclosure, wherein example 2 also includes the subject matter according to example 1, above.

The controller is further configured to determine when the measured distance from at least one of the three or more proximity sensors is outside an allowable distance tolerance and automatically reorient the end effector to the predetermined orientation when the measured distance from the at least one proximity sensor is determined to be outside of the allowable distance tolerance. The preceding subject matter of this paragraph characterizes example 3 of the present disclosure, wherein example 3 also includes the subject matter according to any of examples 1-2, above.

Additionally, the controller is configured to determine when the average of the measured distances is outside an allowable average-distance tolerance from the surface, the allowable average-distance tolerance corresponding with the predetermined operating distance and automatically move the end effector to the predetermined operating distance when the average of the measured distances is determined to be outside of the allowable average-distance tolerance. The preceding subject matter of this paragraph characterizes example 4 of the present disclosure, wherein example 4 also includes the subject matter according to example 3, above.

The three or more proximity sensors comprise four proximity sensors on and spaced apart from each other on the end effector. The preceding subject matter of this paragraph characterizes example 5 of the present disclosure, wherein example 5 also includes the subject matter according to of any examples 1-4, above.

The four proximity sensors comprise a first set of proximity sensors and a second set of proximity sensors. The first set of proximity sensors comprises two proximity sensors that are opposite each other on the end effector and spaced apart at a first length from each other. The second set of proximity sensors comprises two other proximity sensors, that are opposite each other on the end effector and spaced apart at a second length from each other. The first length and the second length are equal. The preceding subject matter of this paragraph characterizes example 6 of the present disclosure, wherein example 6 also includes the subject matter according to example 5, above.

The system further comprises a scanning apparatus disposed on the end effector and configured to scan the surface. The controller is configured to maintain the end effector at the predetermined operating distance while the scanning apparatus is scanning the surface. The predetermined operating distance correlating with the distance of the scanning apparatus relative to the surface such that the scanning apparatus is displaced from the surface. The preceding subject matter of this paragraph characterizes example 7 of the present disclosure, wherein example 7 also includes the subject matter according to any of examples 1-6, above.

Additionally, the system comprises a machining tool disposed on the end effector and configured to machine the surface as the scanning apparatus is scanning the surface. The preceding subject matter of this paragraph characterizes example 8 of the present disclosure, wherein example 8 also includes the subject matter according to example 7, above.

The end effector further comprises manual input features, onboard the end effector and configured to be manually manipulated to adjust a location of the end effector relative to the surface. The preceding subject matter of this paragraph characterizes example 9 of the present disclosure, wherein example 9 also includes the subject matter according to any of examples 1-8, above.

Each one of the three or more proximity sensors generates a beam and is individually adjustable to adjust an angle of the beam relative to a central axis of the end effector. The preceding subject matter of this paragraph characterizes example 10 of the present disclosure, wherein example 10 also includes the subject matter according to any of examples 1-9, above.

Further disclosed herein is a system for inspecting a part. The system comprises a surface to be inspected and a robotic system. The robotic system comprises a robot comprising an articulating arm and an end effector, coupled to the articulating arm. The robotic system further comprises three or more proximity sensors on the end effector and spaced apart from each other. Each one of the three or more proximity sensors is configured to detect a measured distance from the proximity sensor to the surface, such that the end effector is continuously displaced from the surface. The robotic system also includes a controller. The controller is configured to receive measured distances from the three or more proximity sensors. The controller is also configured to orient the end effector to a predetermined orientation based on the measured distances. The controller is further configured to, after orienting the end effector to the predetermined orientation, calculate an average of the measured distances. Additionally, the controller is configured to move the end effector to a predetermined operating distance from the surface based on the average of the measured distance. The preceding subject matter of this paragraph characterizes example 11 of the present disclosure.

The controller is further configured to orient the end effector to a perpendicular orientation, normal to the surface, based on the measured distances. The preceding subject matter of this paragraph characterizes example 12 of the present disclosure, wherein example 12 also includes the subject matter according to example 10, above.

Additionally, the controller is further configured to direct movement of the end effector to follow a scanning pattern along the surface. As the end effector is following the scanning pattern, the controller is configured to determine when the measured distance from at least one of the three or more proximity sensors is outside an allowable distance tolerance. The controller is also configured to automatically reorient the end effector to the predetermined orientation when the measured distance from the at least one proximity sensor is determined to be outside of the allowable distance tolerance. The controller is further configured to determine when the average of the measured distances is outside an allowable average-distance tolerance from the surface, the allowable average-distance tolerance corresponding with the predetermined operating distance. Additionally, the controller is configured to automatically move the end effector to the predetermined operating distance when the average of the measured distances is determined to be outside of the allowable average-distance tolerance. The preceding subject matter of this paragraph characterizes example 13 of the present disclosure, wherein example 13 also includes the subject matter according to any of examples 11-12, above.

The controller is further configured to maintain the end effector at the predetermined orientation and the predetermined operating distance as the surface is moved relative to the end effector. The controller is configured to determine when the measured distance from at least one of the three or more proximity sensors is outside an allowable distance tolerance. The controller is also configured to automatically reorient the end effector to the predetermined orientation when the measured distance from the at least one proximity sensor is determined to be outside of the allowable distance tolerance. The controller is further configured to determine when the average of the measured distances is outside an allowable average-distance tolerance from the surface, the allowable average-distance tolerance corresponding with the predetermined operating distance. Additionally, the controller is configured to automatically move the end effector to the predetermined operating distance when the average of the measured distances is determined to be outside of the allowable average-distance tolerance. The preceding subject matter of this paragraph characterizes example 14 of the present disclosure, wherein example 14 also includes the subject matter according to any of examples 11-12, above.

Additionally, disclosed herein is a method of inspecting a part. The method comprising the step of moving an end effector, via an articulating arm of a robot, relative to a target location on a surface. The method also comprises the step of detecting a measured distance from the target location on the surface to each one of three or more proximity sensors disposed on the end effector and spaced apart from each other. The method also comprises the step of orienting the end effector at a predetermined orientation based on the measured distances. The method further comprises the step of, after orientating the end effector to the predetermined orientation, calculating an average of the measured distances. Additionally, the method comprises the step of moving the end effector to a predetermined distance from the surface based on the average of the measured distances. The preceding subject matter of this paragraph characterizes example 15 of the present disclosure.

The step of moving the end effector, via the articulating arm of the robot, further comprises manipulating manual input features, onboard the end effector, to adjust a location of the end effector relative to the surface, such that beam generated from the three or more proximity sensors align with the target location on the surface. The preceding subject matter of this paragraph characterizes example 16 of the present disclosure, wherein example 16 also includes the subject matter according to example 15, above.

The method further comprises the step of individually adjusting an angle of a beam generated from each of the three of more proximity sensors to align with the target location on the surface. The preceding subject matter of this paragraph characterizes example 17 of the present disclosure, wherein example 17 also includes the subject matter according to any of examples 15-16, above.

The method further comprises the step of maintaining the end effector at the predetermined orientation and the predetermined operating distance as the end effector follows a scanning pattern along the surface. The method also comprises the step of determining when the measured distance from at least one of the three or more proximity sensors is outside an allowable distance tolerance. The method further comprises the step of automatically reorienting the end effector to the predetermined orientation when the measured distance from the at least one proximity sensor is determined to be outside of the allowable distance tolerance. The method additionally comprises the step of determining when the average of the measured distances is outside an allowable average-distance tolerance from the surface, the allowable average-distance tolerance corresponding with the predetermined operating distance. The method also comprises the step of automatically moving the end effector to the predetermined operating distance when the average of the measured distances is determined to be outside of the allowable average-distance tolerance. The preceding subject matter of this paragraph characterizes example 18 of the present disclosure, wherein example 18 also includes the subject matter according to any of examples 15-17, above.

The method further comprises the step of maintaining the end effector at the predetermined orientation and the predetermined operating distance as the surface is moved relative to the end effector. The method also comprises the step of determining when the measured distance from at least one of the three or more proximity sensors is outside an allowable distance tolerance. The method further comprises the step of automatically reorienting the end effector to the predetermined orientation when the measured distance from the at least one proximity sensor is determined to be outside of the allowable distance tolerance. The method additionally comprises the step of determining when the average of the measured distances is outside an allowable average-distance tolerance from the surface, the allowable average-distance tolerance corresponding with the predetermined operating distance. The method also comprises the step of automatically moving the end effector to the predetermined operating distance when the average of the measured distances is determined to be outside of the allowable average-distance tolerance. The preceding subject matter of this paragraph characterizes example 19 of the present disclosure, wherein example 19 also includes the subject matter according to any of examples 15-17, above.

The method further comprises the step of scanning the surface to detect anomalies in the surface, via a scanning apparatus disposed on the end effector. The predetermined operating distances correlating with the distance of the scanning apparatus relative to the surface such that the scanning apparatus is displaced from the surface. The preceding subject matter of this paragraph characterizes example 20 of the present disclosure, wherein example 20 also includes the subject matter according to any of examples 15-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
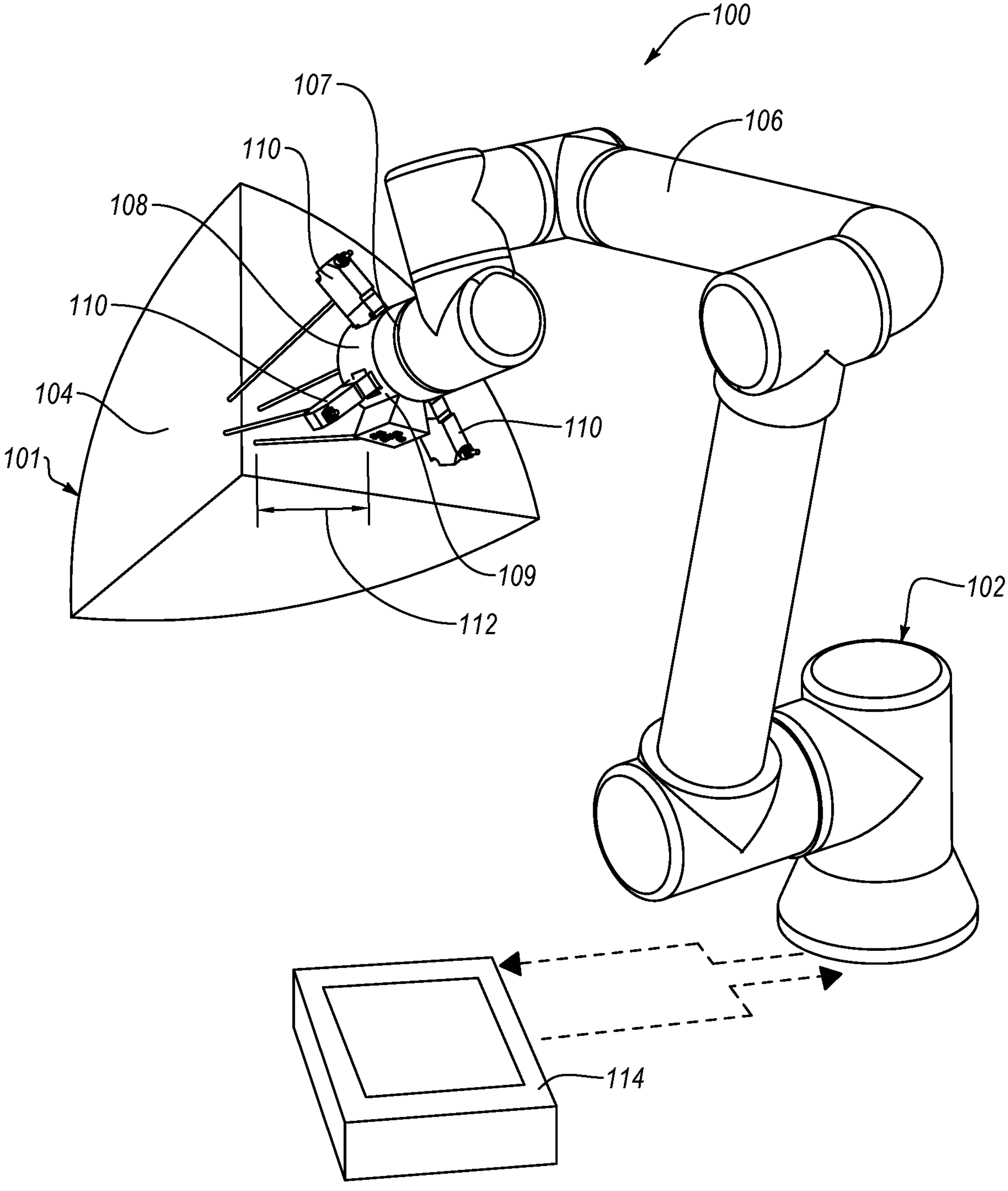
FIG. 1 is a schematic perspective view of a robotic system for inspecting a part, according to one or more examples of the present disclosure.

Referring to FIG. 1, one example of a robotic system 100 is shown. The robotic system 100 is used to inspect parts, such as parts having complex or curved surfaces, without contacting a surface of the part. In one example, the part is a vehicle, such as an aircraft. As an example, aircraft may be required to be inspected for wear and damage. The complex and curved surfaces in an aircraft make it difficult to visually inspect all surfaces. One solution is to use robots with inspection devices that contact the surface of the aircraft and are programmed to follow probes or guides, such as rails, that the inspection devices can move along while maintaining contact with the surface. However, there may be some areas of the surface that are not accessible via a robot-controlled and surface-contacting end effector. Additionally, some surfaces, which are prone to damage if impacted by an end effector, are not conducive to surface inspections that require surface contact. For these and other reasons, a robotic system 100 for inspecting parts, in a contactless manner (e.g., while positioned away from the surface of the part), and corresponding methods are disclosed.

The robotic system 100 includes a robot 102. In some examples, the robot 102 has an articulating arm 106 or an arm with multiple, independently articulatable segments. According to one example, the articulating arm 106 is a mechanical arm that facilitates movement of a tool center point 107 of the robot 102, located at the end of the articulating arm 106, with multiple degrees of freedom (e.g., six degrees of freedom), including adjustability of a distance (i.e., movement along a z-axis), a position (i.e., movement along a x-axis and/or y-axis that are perpendicular to the z-axis), and an orientation (e.g. rotation about one or more of the x-axis, y-axis, or z-axis) of the tool center point 107 relative to a surface 104. In one example, the robot 102 is a collaborative robot, or cobot, such as a commercially available cobot, which may be beneficial due to its general availability, cost-effectiveness and ease of programming. In other examples, the robot 102 is a custom designed robot, with custom specifications, such as the overall size of the robot or length of the articulating arm 106. Customizing the specifications of the robot 102 may be particularly useful for inspecting uniquely shaped or sized surfaces of parts.

The robotic system 100 further comprises an end effector 108, which is coupled to the articulating arm 106 at the tool center point 107 of the robot 102. The end effector 108 is fixed relative to the tool center point 107, such that the end effector 108 experiences the same movement as the tool center point 107, which is moved by the articulating arm 106. Accordingly, as the articulating arm 106 moves the tool center point 107 relative to a part 101 the end effector 108 correspondingly moves relative to the part 101.

The end effector 108 includes a base 109 and a plurality of proximity sensors 110. The proximity sensors 110 are coupled to the base 109 of the end effector 108 and spaced apart from each other. The proximity sensors 110 are configured to detect and measure the distance from the proximity sensor 110 to the surface 104 of the part 101. As used herein the distance detected by the proximity sensors 110, from each proximity sensor 110 to the surface 104, is called a measured distance 112. Generally, each proximity sensor 110 emits an emitted beam and receives a corresponding reflected beam reflected off of the surface 104. The characteristics of the emitted beam and the reflected beam are compared to determine the measured distance 112.

In some examples, the plurality of proximity sensors 110 includes three or more proximity sensors 110. In one example, the plurality of proximity sensors 110 includes four proximity sensors 110. In certain examples, the plurality of proximity sensors 110 are equidistantly spaced apart about a perimeter of the base 109 of the end effector 108. In other examples, the plurality of proximity sensors 110 are located on opposite sides of the base 109 of the end effector 108, such that, for example, a first row of proximity sensors 110 is on one side of the base 109 and a second row of proximity sensors 110 is on an opposite side of the base 109. The number of proximity sensors 110 and spacing of the proximity sensors 110 are configured to allow each one of the proximity sensors 110 to detect a corresponding measured distance 112, which is utilized to orient and position the end effector 108 to a predetermined orientation and predetermined operating distance relative to the surface 104.

The proximity sensors 110 may be any type of sensors capable of detecting the measured distance 112 including, but not limited to, an RF-antenna sensor, an optical sensor, a laser sensor, a radar sensor, a sonar sensor, a lidar sensor, an ultrasonic sensor, an x-ray sensor, an acoustic sensor, and/or an infrared sensor.

The robotic system 100 further includes a controller 114 in electrical communication with the robot 102. In some examples, the controller 114 is configured to automatically control the movement of the robot 102. In other examples, the controller 114 is configured to allow a user to control the movement of the robot 102 manually. For example, the controller 114 may be operated by a user via a computer terminal. The computer terminal may be configured to provide various measurements to the user including, but not limited to, the distance from each proximity sensor 110 to the surface 104 and the orientation of the end effector 108 relative to the surface 104. Using the controller 114, and the data determined by the controller 114, the user can move the robot 102 via the computer terminal.

In yet other examples, the controller 114 may be configured to allow both user control of the movement of the robot 102 and automatic control of the robot 102. For example, a user can utilize the controller 114 to move the end effector 108 to a distance and/or orientation, relative to the surface 104, based on the measured distance 112 from the proximity sensors 110 or the user's preferences, then allow the controller 114 to automatically make further adjustments to the distance and/or orientation to move the end effector 108 to the predetermined orientation and predetermined operating distance relative to the surface 104.

Figure 2:
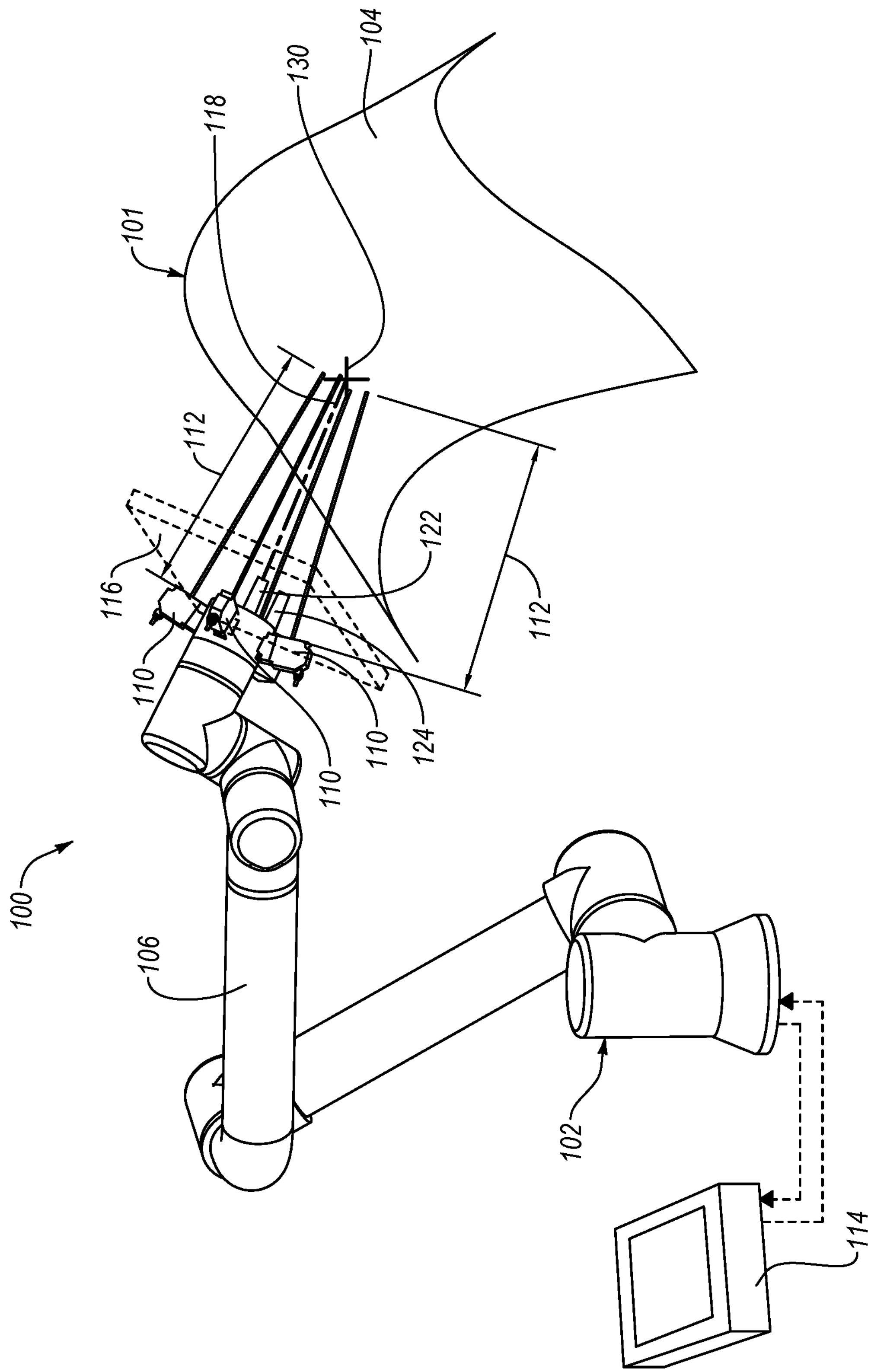
FIG. 2 is a schematic perspective view of a robotic system for inspecting a part, according to one or more examples of the present disclosure.

Referring to FIG. 2, the robotic system 100 is shown inspecting a part 101. The robot 102 of the robotic system 100 is capable of moving relative to the part 101, and therefore the end effector 108, fixed relative to the tool center point 107 of the robot 102, is capable of moving relative to the part 101. The controller 114 is configured to move the robot 102, and thus the end effector 108, based on the measured distances 112 from the proximity sensors 110 on the end effector 108. In one example, the controller 114 is configured to receive the measured distances 112 from the plurality of proximity sensors 110. Using the measured distances 112 from each of the plurality of proximity sensors 110, the controller 114 can orient the end effector 108 to a predetermined orientation 116 relative to the surface 104. For example, the predetermined orientation 116 may be an orientation that is perpendicular, or normal, to the surface 104. In other examples, the predetermined orientation 116 may be angled relative to normal, such as an angle of 10 degrees from normal.

After orientating the end effector 108 to the predetermined orientation 116, the controller 114 is configured to calculate an average of the measured distances 112 from each of the proximity sensors 110. The controller 114 is further configured to move the end effector 108 to a predetermined operating distance 118 from the surface 104 based on the average of the measured distances 112. For example, if the end effector 108 is targeting a target location 130 and the predetermined orientation was set to a normal orientation and the predetermined operating distance 118 was set to 5 inches±10%, the controller 114 would move the end effector 108 in the x-axis and y-axis until the end effector 108 was at the normal orientation relative to the target location 130. The controller 114 would then move the end effector 108 in the z-axis relative to the surface 104, while keeping the x-axis and y-axis constant, until the average of the measured distances 112 was at 5 inches±10%.

As the robotic system 100 is moved relative to the surface 104, or as the surface 104 is moved relative to the robotic system 100, the controller 114 can be configured to automatically adjust the orientation and distance of the end effector 108 relative to the surface 104, based on the real-time data from the proximity sensors 110. In other words, the controller 114 is configured to utilize a feedback system, based on the continuous detection of the measured distance 112 from each of the proximity sensors 110, to automatically adjust the orientation to the predetermined orientation 116 of the end effector 108 and automatically adjust the distance to the predetermined operating distance 118 of the end effector 108, based on the feedback system. Accordingly, the controller 114 can continuously adjust the orientation and distance of the end effector 108, based on real-time and local information.

In some examples, a tolerance is defined for the predetermined operating distance 118 and/or the predetermined orientation 116. For example, the controller 114 may be configured to determine when the measure distance 112 from at least one of the plurality of proximity sensors 110 is outside of an allowable distance tolerance for the proximity sensor 110 and automatically reorient the end effector 108 to the predetermined orientation 116 when the measured distance 112 from at least one proximity sensor 110 is determined to be outside of the allowable distance tolerance. In other words, although the controller 114 is continuously monitoring the measured distance 112 from the proximity sensors 110, the controller 114 only adjusts the orientation of the end effector 108 if the measured distance 112 shows that at least one of the proximity sensors 110 is outside of the allowable distance tolerance.

Likewise, the controller 114 may be configured to determine when the average of the measured distances 112 from the proximity sensors 110 is outside an allowable average-distance tolerance from the surface 104, the allowable average-distance tolerance corresponding with the predetermined operating distance 118. The controller 114 automatically moves the end effector 108 to the predetermined operating distance 118 when the average of the measured distances 112 is determined to be outside of the allowable average-distance tolerance. In other words, while the controller 114 is continuously monitoring the measured distance 112 from the proximity sensors 110, the controller 114 only adjusts the distance of the end effector 108 relative to the surface 104 if the average of the measured distances 112 is outside of the allowable average-distance tolerance.

As shown in FIG. 2, in some examples, the robotic system 100 further includes a scanning apparatus 122 disposed on the end effector 108 or forming part of the end effector 108. The scanning apparatus 122 is configured to scan the surface 104, while remaining displaced or spaced apart from the surface 104. The scanning apparatus 122 and the end effector 108 do not move relative to each other. In other words, the rotation and/or displacement of the end effector 108 also rotates and/or displaces the scanning apparatus 122. Accordingly, the orientation of the scanning apparatus 122 relative to the surface 104 mirrors the orientation of the end effector 108 relative to the surface 104.

The scanning apparatus 122 may be any type of scanning device capable of scanning or imaging a surface including, but not limited to, a camera, a radar device, a thermo-imaging device, and an x-ray device. The scanning apparatus 122 may be used for wear or defect identification, radar scanning, or to assist while performing maintenance on the part 101. The predetermined operating distance 118 takes into account the length of the scanning apparatus 122, such that the scanning apparatus 122 remains at least a certain distance from the surface 104 to avoid inadvertently contacting the surface 104 while scanning the surface 104.

In some examples, the robotic system 100 can further include a machining tool 124 disposed on the end effector 108 or forming part of the end effector 108. The machining tool 124 is configured to machine the surface 104 while the scanning apparatus 122 is scanning the surface 104. The machining tool 124 may be any type of machining tool 124 capable of machining the surface 104 including, but not limited to a machining tool 124 configured for, laser ablation, $CO_2$ pellet blasting, girt blasting or other media blasting, plasma torch cutting, chemical torch cutting, welding, painting, etc. In some examples, the machining tool 124 remains displaced or spaced apart from the surface 104, such that the machining tool 124 does not contact the surface 104. In other examples, the machining tool 124 may come in contact with the surface 104, while the end effector 108 and scanning apparatus 122 remain displaced from the surface 104.

The robotic system 100 is configured to maintain the predetermined orientation 116 and predetermined operating distance 118 from all types of surface shapes, including complex and curved surfaces, flat surfaces, convex surfaces, or concave surfaces. In some examples, the robotic system 100 may further include secondary proximity sensors, not shown, coupled at any location along to the robotic system 100, such as the articulating arm 106, a base of the robot 102, the end effector 108, etc. The secondary proximity sensors are be configured to detect distances from the corresponding features of the robotic system 100 to surrounding surfaces, and help maintain the corresponding features at a certain distance threshold away from the surrounding surfaces by providing feedback to the controller 114. In other words, secondary proximity sensors may be used to avoid a part of the robotic system 100 from contacting the surface on the part 101. Accordingly, in some examples, while the proximity sensors 110 are utilized to maintain a certain distance away from the surface 104, the secondary proximity sensors can be utilized to maintain a certain distance away from other surfaces not currently being analyzed.

Figure 3:
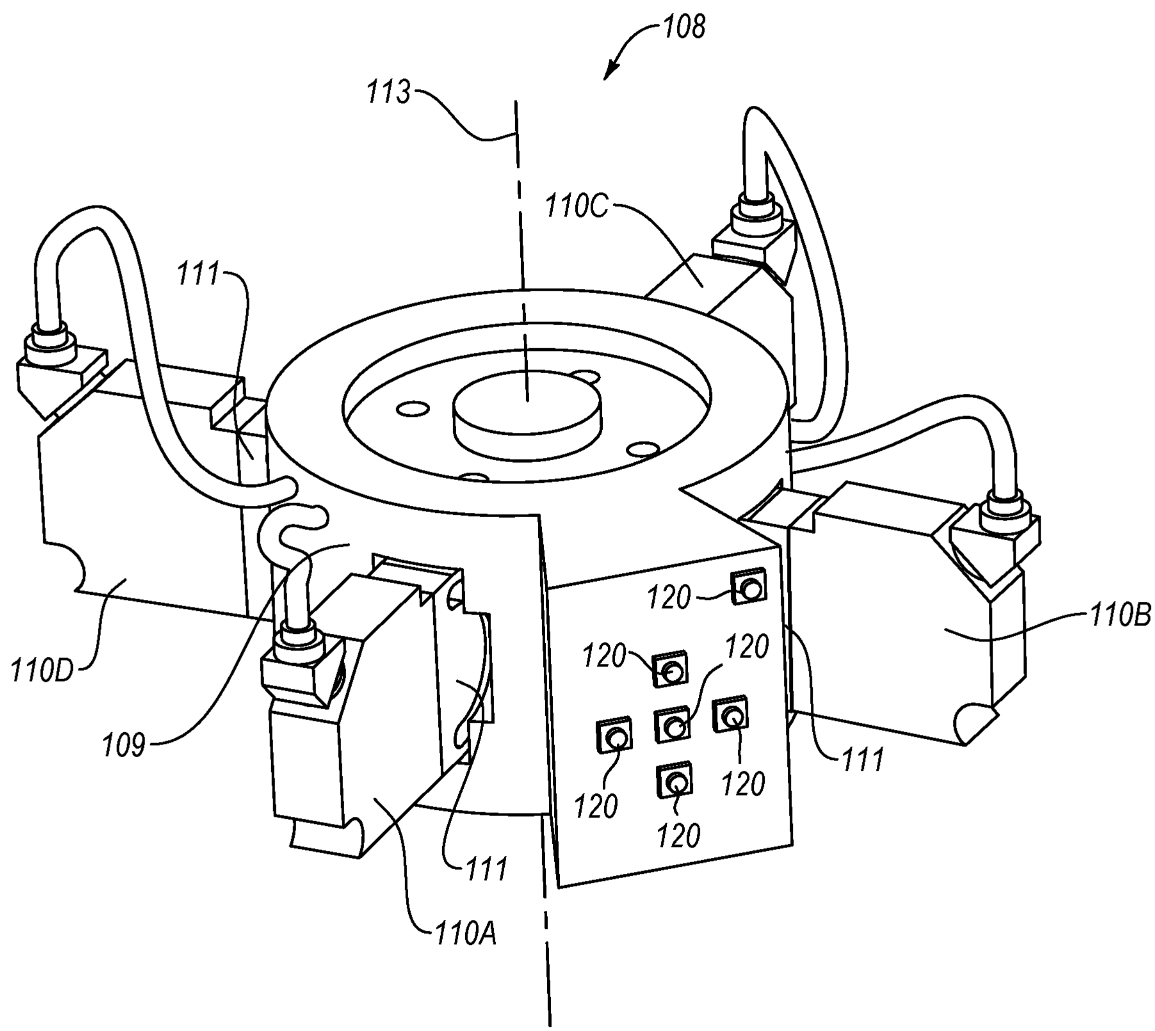
FIG. 3 is a schematic perspective view of an end effector of a robotic system, according to one or more examples of the present disclosure.

Referring to FIG. 3, one example of the end effector 108 is shown. The end effector 108 includes the plurality of proximity sensors 110. As shown, the end effector 108 includes the base 109 and the proximity sensors 110 are coupled to and positioned around the perimeter of the base 109. The proximity sensors 110 are spaced apart from each other. Although shown as circular in FIG. 3, the base 109 of the end effector 108 can have any of various sizes and shapes, such as square or polygonal, and the proximity sensors 110 can be coupled to the base 109 at opposing sides or corners of the base 109.

In one example, as shown in FIG. 3, the end effector 108 includes four proximity sensors 110. The proximity sensors 110 are arranged equidistantly around the base 109 of the end effector 108. In one example, the four proximity sensors 110 include a first proximity sensor 110A, a second proximity sensor 110B, a third proximity sensor 110C, and a fourth proximity sensor 110D. The first proximity sensor 110A and the third proximity sensor 110C form a first set of proximity sensors and the second proximity sensor 110B and the fourth proximity sensor 110D form a second set of proximity sensors. The first proximity sensor 110A and the third proximity sensor 110C of the first set are located opposite each other, on opposite sides of the base 109, and spaced apart a first length apart from each other. The second proximity sensor 110B and the fourth proximity sensor 110C of the second set are located opposite each other, on opposite sides of the base 109, and spaced apart a second length apart from each other. The first length and the second length are equal. Accordingly, beams 126 generated from the first proximity sensor 110A and the third proximity sensor 110C would initiate at the same distance away from each other as the distance between beams 126 generated from the second proximity sensor 110B and the fourth proximity sensor 110D. In some examples, the first set of proximity sensors may be used to control the x-axis when calculating and orienting to the predetermined orientation and the second set of proximity sensors may be used to control the y-axis when calculating and orienting to the predetermined orientation.

In certain examples, the end effector 108 includes manual input features 120. The manual input features 120 are configured to be manually manipulated, by a user, to adjust a location of the end effector 108 relative to the surface 104. In some examples, the manual input features 120 are used, prior to any adjustments by the controller 114, to position the end effector 108 near a target location on the part 101. Such manual positioning may be helpful in locating the end effector 108 close to the predetermined orientation and predetermined operating distance before using the controller 114 to automatically fine-tune the position by adjusting the orientation and distance to the predetermined values. In some examples, the manual input features 120 may be used, after the controller 114 has positioned the end effector 108 to the predetermined orientation and predetermined operating distance, to adjust the end effector 108 to another orientation, position from a target location (i.e., move in the x-axis and/or y-axis), and/or adjust the distance away from the target location (i.e., move in the z-axis). In other words, the manual input features 120 can be used to manually change the orientation, position, and/or distance from the measurements automatically determined by the controller 114 at the target location 130. Manually manipulation of the manual input features 120 may result in any of various operations, including but not limited to, moving the end effector 108 along the x-axis, moving the end effector 108 along the y-axis, normalizing the end effector 108 at the current distance away from the surface, and/or moving the end effector 108 away from the surface. Additionally, in certain examples, at least one of the manual input features 120 is configured to change an operation state of the robot 102 into a free-drive mode, which allows the user to manually position the robot 102 at the user's discretion by using other ones of the manual input features 120.

The manual input features 120 may be any type of feature capable of manually manipulation by a user including, but not limited to, buttons, switches, knobs, joystick, touch pad, etc.

The end effector 108 may include a plurality of actuators 111 each coupling a corresponding one of the proximity sensors 110 to the base 109. Moreover, the actuators 111 are actuatable to adjust an orientation of the proximity sensors 110 relative to the base 109. In some examples, each one of the actuators 111 is independently actuatable, relative to the other ones of the actuators 111, to adjust an orientation of a corresponding one of the proximity sensors 110 relative to the other ones of the proximity sensors 110. According to certain examples, the actuators 111 facilitate rotational motion of the proximity sensors 110 about respective axes that are perpendicular to a central axis 113 of the base 109. Adjusting the orientation of the proximity sensors 110 relative to the base 109 adjusts an angle of the beams 126, relative to the central axis 113 of the base 109, generated by the proximity sensors 110.

The actuators 111 may by any type of actuator capable of rotational movement relative to the base 109 including but not limited to, electric actuators, hydraulic actuators, pneumatic actuators, and manual actuators. The actuators 111 may be manually adjustable by a user or adjustable by the controller 114. Generally, each of the proximity sensors 110 will be adjusted, via the actuator 111, to the same orientation relative to the base 109. In some examples, such as when a scanning apparatus 122 (see, e.g., FIG. 2) is disposed on the end effector 108, the rotation of the actuators 111 relative to the base 109 may be limited, as the beams 126 generated by each proximity sensors 110 need to extend, undisturbed past the scanning apparatus 122 or any additional attachments, to the surface 104.

In some examples, the proximity sensors 110 are removable from the end effector 108 and exchangeable for other sizes or types of proximity sensors 110. For example, based on the part 101 being inspected, exchanging a proximity sensor 110, which generates a narrow ultrasonic beam, for a proximity sensor 110, which generates an wide ultrasonic beam, or exchanging a laser proximity sensor for an ultrasonic proximity sensor, etc., may be desirable.

Figure 4A:
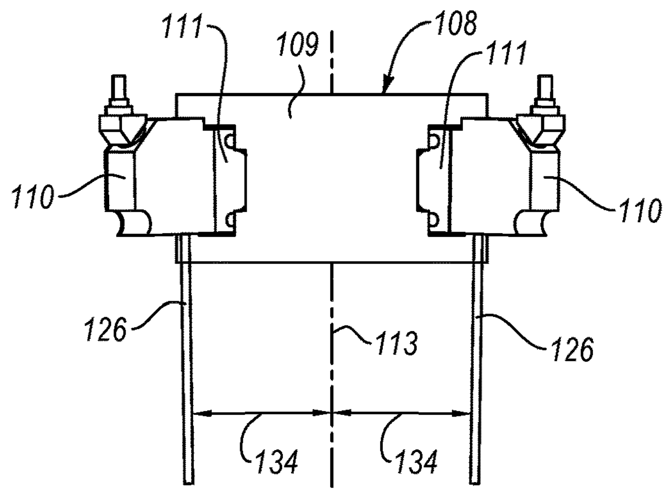
FIG. 4A is a schematic side view of an end effector of a robotic system, according to one or more examples of the present disclosure.
Figure 4B:
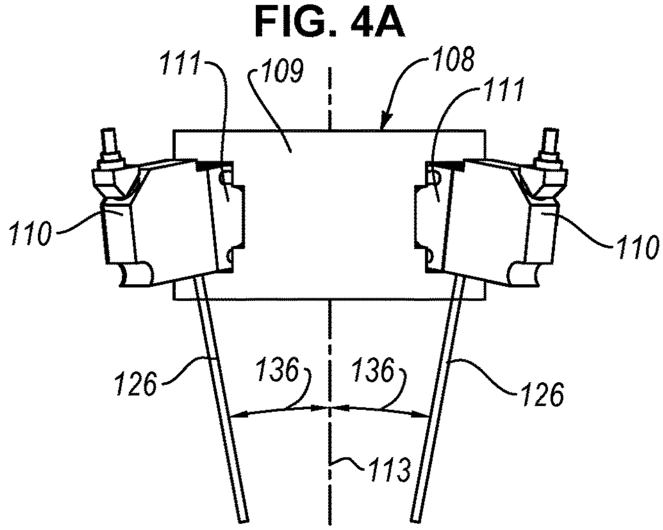
FIG. 4B is a schematic side view of the end effector of FIG. 4A, according to one or more examples of the present disclosure.
Figure 4C:
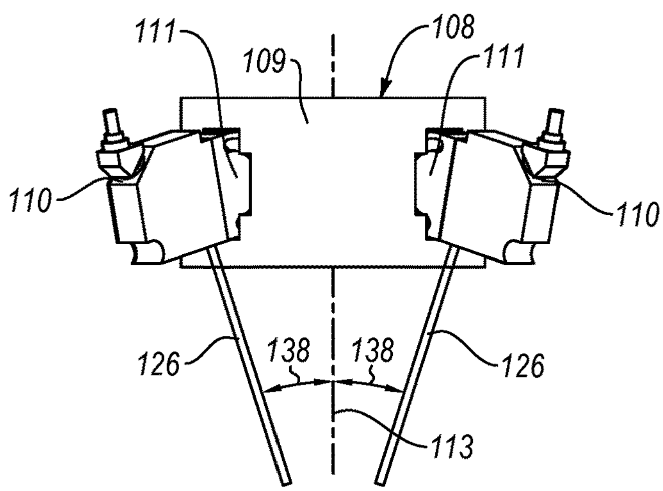
FIG. 4C is a schematic side view of the effector of FIG. 4A, according to one or more examples of the present disclosure.

Referring to FIGS. 4A-4C, a side view of the end effector 108 of FIG. 3 is shown. The plurality of proximity sensors 110 on the end effector 108 are each generating a beam 126. The beams 126 are shown for illustrative purposes only, as most proximity sensors 110 will not produce a visual beam. FIG. 4A shows the beam 126 generated from each of the proximity sensors 110 extending at a first angle 134 parallel relative to the central axis 113 of the end effector 108. Depending on the size of the end effector 108 and distance of the end effector 108 from the surface 104, beams 126 generated parallel to the central axis 113 may be able to effectively target a target area on the surface 104. However, in some examples, it may be necessary or produce more effective calculations to adjust the angle of the generated beams 126. As shown in FIG. 4B, the beams 126 are angled inwardly, toward the central axis 113, at a second angle 136 relative to the central axis 113. In one example, the beams 126 are angled inwardly at 5 degrees towards the central axis 113. In another example, the beams 126 are angled inwardly towards the central axis 113 at between 1 degree and 15 degrees. As shown in FIG. 4C, the beams 126 are angled at a third angle 138, which is more than the first angle 134 or the second angle 136, such as being angled at 15 degrees or more toward the central axis 113. In some examples, the angle of the beams 126 can be adjusted to target the beams 126 as close as possible to a target area on the surface 104, without crossing the beams 126 in mid-air before the beams 126 reach the surface 104.

Figure 5:
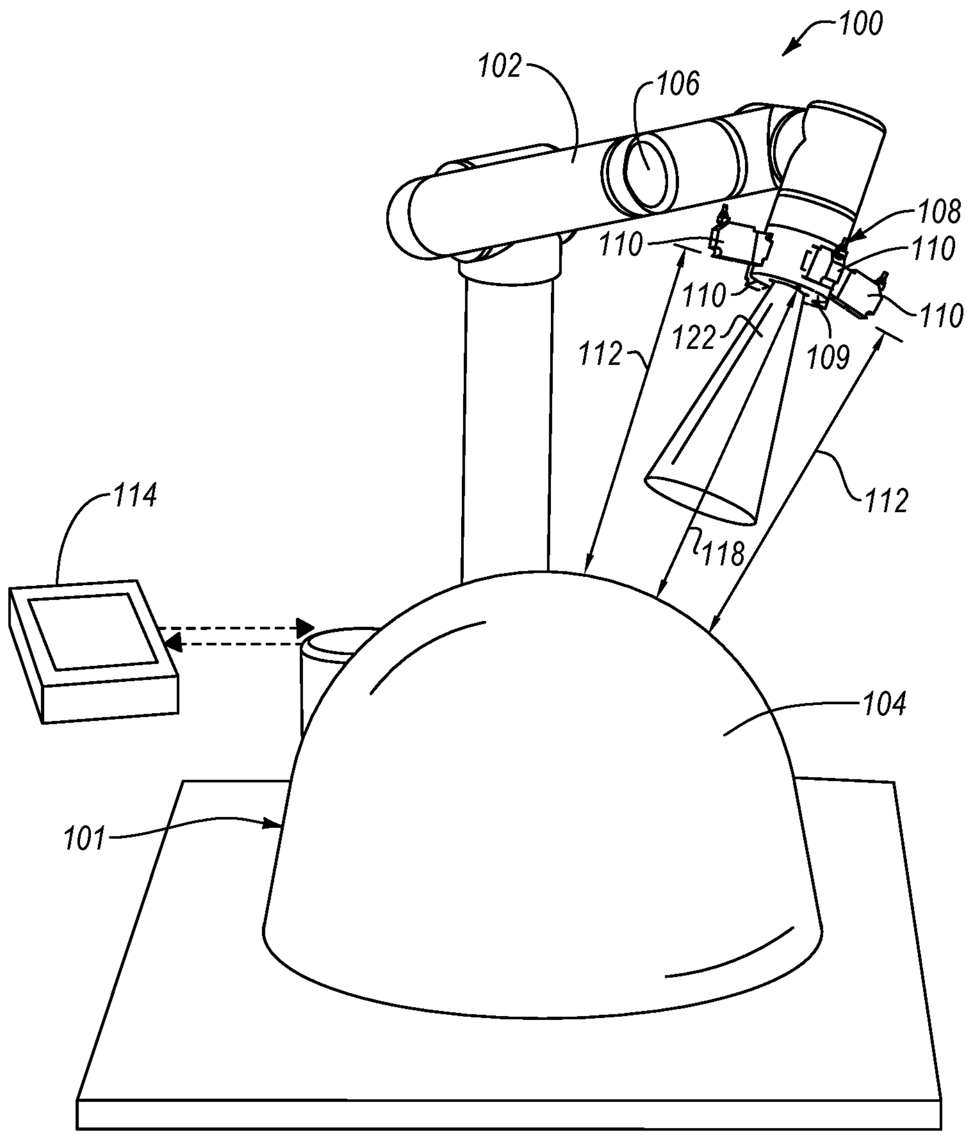
FIG. 5 is a schematic perspective view of a robotic system for inspecting a part, according to one or more examples of the present disclosure.

As shown in FIG. 5, the robotic system 100 is scanning a part 101, via a scanning apparatus 122 coupled to the end effector 108. In the illustrated example of FIG. 5, the surface 104 of the part 101 is convexly curved. In one example, the robotic system 100 is used to target a target location 130 on the surface 104, as the part 101 remains fixed. Prior to using the controller 114 for analyzing the measured distances 112, the end effector 108 can be positioned near the target location 130 manually by a user using the manual input features 120 (see, e.g., FIG. 3). After positioning the end effector 108 near the target location 130, the controller 114 can be used to analyze the measured distances 112 from the plurality of proximity sensors 110 to orient the end effector 108 to the predetermined orientation and predetermined operating distance. In one example, the manual input features 120 can be used to further adjust the position of the end effector 108 in the x-axis and y-axis to target the target location 130, if necessary. The controller 114 can automatically calculate, and adjust when necessary, the orientation and distance of the end effector 108 while the manual input features 120 are manually manipulated to maintain the predetermined orientation and/or predetermined operating distance from the surface 104. Once the end effector 108 is at the predetermined orientation and predetermined distance at the target location 130, any scanning or imaging of the surface 104 can be performed. Additionally, machining tools may be used to machine the surface 104 at the target location 130.

In another example, the robotic system 100 is used to move the robot 102 relative to the part 101, as the part 101 remains fixed. The robot 102 is moved over the surface 104 of the part 101 in a scanning pattern. Any scanning pattern can be used to scan the part 101. The robot 102 may be preprogrammed to follow a scanning pattern or the controller 114 may instruct the robot 102 to move in a scanning pattern. In one example, while moving in the scanning pattern, the robotic system 100 may be scanning and/or imaging the surface 104 of the part 101 using a scanning apparatus 122 disposed on the end effector 108. In another example, while moving in the scanning pattern, the robotic system 100 may be using both the scanning apparatus 122 and a machining tool, not shown, to perform any maintenance or repairs to the surface 104.

The controller 114 utilizes a feedback system to continuously monitor the measured distances 112 from each of the proximity sensors 110, and automatically adjust the orientation to the predetermined orientation, as well as, automatically adjust the operating distance to the predetermined operating distance, as the robot 102 is moved over the surface 104. In some examples, the controller 114 will determine if at least one measured distance 112 corresponding to a proximity sensor 110 is outside an allowable distance tolerance, and only adjust the end effector 108 to the predetermined orientation when at least one measured distance 112 is outside the allow distance tolerance. In other examples, the controller 114 will also determine where the average of the measured distances 112 is outside an allowable average-distance tolerance from the surface 104, and only adjust the end effector 108 to the predetermined operating distance when the average of the measured distances 112 is determined to be outside of the allowable average-distance tolerance.

In yet another example, the robotic system 100 is used to keep the robot 102 relatively still, only adjusting the orientation and distance of the end effector 108 relative to the surface 104, while the part 101 is moved relative to the robot 102. As the part 101 is moved, relative to the robot 102, the proximity sensors 110 are continuously detecting the measured distance 112 from the proximity sensor 110 to the surface 104. The controller 114 can use the measured distances 112 to automatically adjust the orientation and distance of the end effector 108 based on the current position of the end effector 108 relative to the surface 104, to keep the end effector 108 at the predetermined orientation and predetermined operating distance. As described above, the controller 114 can also account for tolerances within the measured distances 112 and average of the measured distances 112 when determining whether the orientation or distance should be adjusted.

Figure 6:
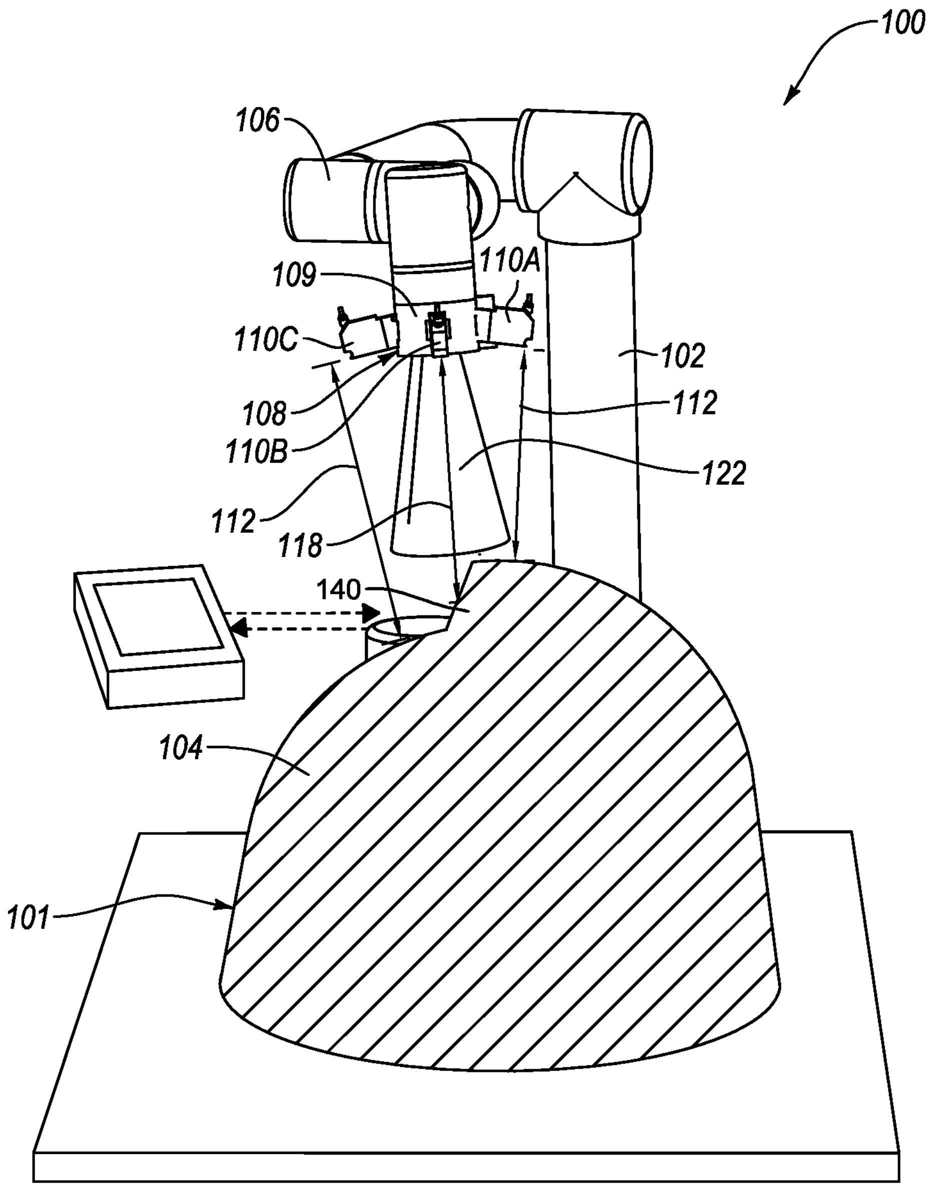
FIG. 6 is a schematic perspective view of a robotic system for inspecting a part, according to one or more examples of the present disclosure.

Referring to FIG. 6, the robotic system 100 is scanning a part 101 with a complex shape. As the robot 102 is moved relative to the surface 104, or as the surface 104 is moved relative to the robot 102, the controller 114 is continuously determining whether to adjust the orientation and distance of the end effector 108 relative to the current position of the end effector 108 relative to the surface 104. For example, as the robot 102 passes over a step 140 in the surface 104, proximity sensor 110A will detect a different measured distance 112 than the measured distance 112 proximity sensor 110C. The controller 114 can use the measured distance 112 from proximity sensor 110A and the measured distance 112 from proximity sensor 110C, as well as, measured distances 112 from any other proximity sensors 110, such as proximity sensor 110B, to adjust the orientation and distance of the end effector 108, based on the real-time measured distances 112. In some examples, the allowable distance tolerance and the allowable average-distance tolerance are considered, to determine if either the measured distances 112 or average of the measure distances 112 is outside of the corresponding tolerance before the end effector 108 orientation and/or distance is adjusted.

Figure 7:
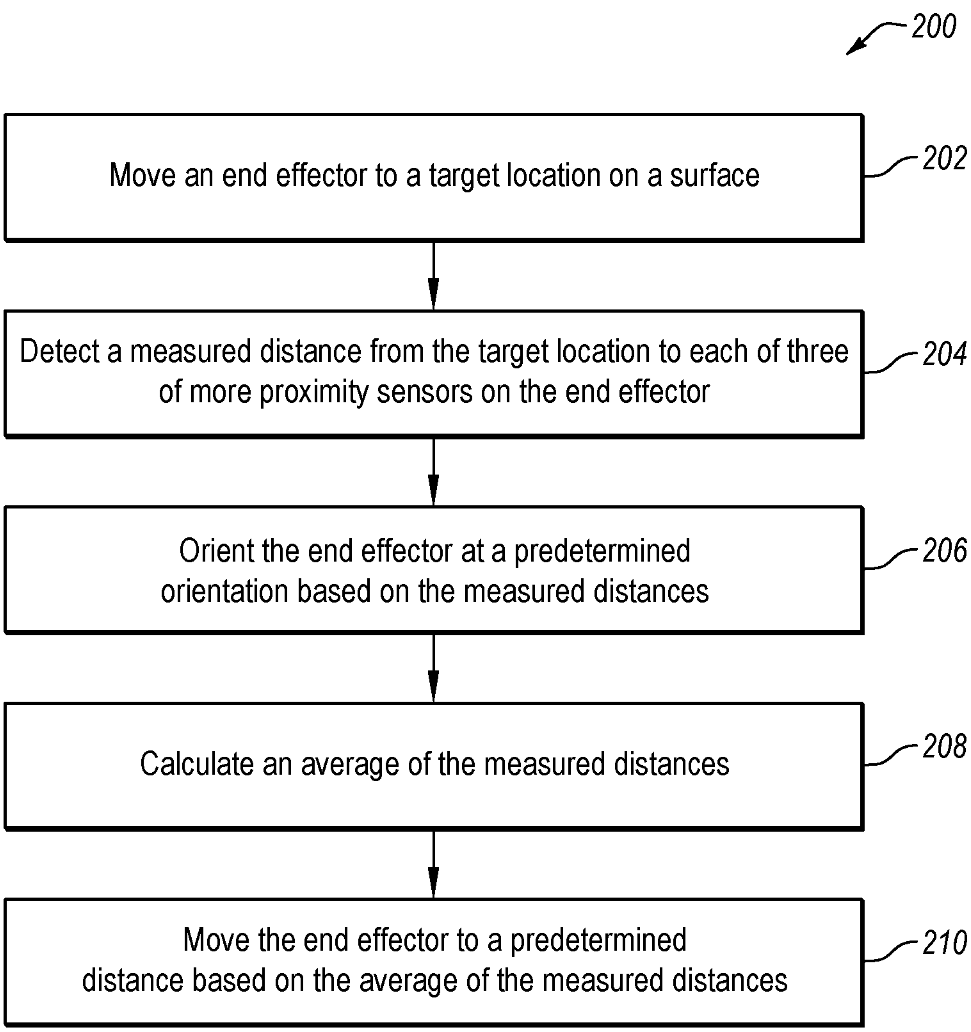
FIG. 7 is a schematic flow diagram of a method of inspecting a part, according to one or more examples of the present disclosure.

Now referring to FIG. 7, one example of a method 200 of inspecting a part is shown. The method 200 includes (block 202) moving the end effector 108, via the articulating arm 106 of the robot 102, relative to the target location 130 on the surface 104. The method 200 also includes (block 204) detecting the measured distance 112 from the target location 130 on the surface 104 to each one of three or more proximity sensors 110 on the end effector 108 and spaced apart from each other. The method 200 includes (block 206) orienting the end effector 108 at the predetermined orientation 116 based on the measured distances 112. After orientating the end effector 108 to the predetermined orientation 116, the method also includes (block 208), calculating the average of the measured distances 112. The method further includes (block 210) moving the end effector 108 to the predetermined distance 118 from the surface 104 based on the average of the measured distances 112.

In some examples, the method 200 further includes manipulating manual input features 120, onboard the end effector 108, to adjust the location of the end effector 108 relative to the surface 104. In one example, the manual input features 120 are adjusted such that beams 126 generated from the three or more proximity sensors 110 align with the target location 130 on the surface 104.

In certain examples, the method 200 further includes maintaining the end effector 108 at the predetermined orientation 116 and the predetermined operating distance 118 as the end effector 108 follows a scanning pattern along the surface 104. In one example, the controller 114 determines when the measured distance 112 from at least one of the three or more proximity sensors 110 is outside an allowable distance tolerance and automatically reorients the end effector 108 to the predetermined orientation 116 when the measured distance 112 from the at least one proximity sensor 110 is determined to be outside of the allowable distance tolerance. Additionally, in some examples, the controller 114 determines when the average of the measured distances 112 is outside an allowable average-distance tolerance from the surface 104, the allowable average-distance tolerance corresponding with the predetermined operating distance 118 and automatically moves the end effector 108 to the predetermined operating distance 118 when the average of the measured distances 112 is determined to be outside of the allowable average-distance tolerance.

In some examples, the method includes maintaining the end effector 108 at the predetermined orientation 116 and the predetermined operating distance 118 as the surface 104 is moved relative to the end effector 108. As described above, the controller 114, in some examples, determines when the measures distance 112 is outside the allowable distance tolerance and/or the average of the measure distances 112 is outside the allowable average-distance tolerance and automatically adjusts the end effector 108 accordingly.

Although described in a depicted order, the method may proceed in any of a number of ordered combinations.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A robotic system for inspecting a part, comprising:

a robot comprising an articulating arm and an end effector coupled to the articulating arm;

three or more proximity sensors coupled to a base of the end effector and spaced apart from each other, wherein each one of the three or more proximity sensors is configured to generate a beam and detect a measured distance from the proximity sensor to a surface, such that the end effector is continuously displaced from the surface;

a scanning apparatus disposed on the base of the end effector, displaced from the surface, and configured to scan the surface when displaced from the surface;

three or more actuators on the base of the end effector, wherein each one of the three or more actuators couples a corresponding one of the three or more proximity sensors to the base of the end effector, and each one of the three or more actuators is actuatable, relative to any other one of the three or more actuators, to adjust an orientation of the corresponding one of the three or more proximity sensors relative to the base, such that an angle of the beam generated by the corresponding one of the three or more proximity sensors is adjusted relative to the base; and a controller configured to:

receive measured distances from at least three proximity sensors of the three or more proximity sensors;

orient the end effector to a predetermined orientation based on the measured distances;

after orienting the end effector to the predetermined orientation, calculate an average of the measured distances from each of the at least three proximity sensors;

move the end effector to a predetermined operating distance from the surface based on the average of the measured distances, the predetermined operating distance correlating with a distance between the scanning apparatus and the surface to maintain displacement of the scanning apparatus from the surface; and direct movement of the end effector to follow a scanning pattern along the surface, wherein as the end effector is following the scanning pattern, the controller is further configured to:

determine when the average of the measured distances from the at least three proximity sensors is outside an allowable average-distance tolerance from the surface; and automatically move the end effector to the predetermined operating distance when the average of the measured distances is determined to be outside of the allowable average-distance tolerance.

2. The robotic system of claim 1, wherein the controller is further configured to orient the end effector to a perpendicular orientation, normal to the surface, based on the measured distances.

3. The robotic system of claim 1, wherein the controller is further configured to automatically reorient the end effector to the predetermined orientation when the measured distance from at least one of the three or more proximity sensors is determined to be outside of an allowable distance tolerance.

4. The robotic system of claim 1, wherein the allowable average-distance tolerance is +/−10% of the predetermined operating distance, wherein the predetermined operating distance is 5 inches.

5. The robotic system of claim 1, wherein the three or more proximity sensors are spaced apart from each other on the end effector and comprise a first set of proximity sensors and a second set of proximity sensors wherein:

the first set of proximity sensors comprises two proximity sensors that are opposite each other on the end effector and spaced apart at a first length from each other;

the second set of proximity sensors comprises two other proximity sensors, that are opposite each other on the end effector and spaced apart at a second length from each other; and the first length and the second length are equal; and each proximity sensor of the at least three proximity sensors is configured to emit a beam and receive a reflected beam corresponding to the beam, the reflected beam being reflected off of the surface.

6. The robotic system of claim 1, wherein the controller is configured to maintain the end effector at the predetermined operating distance while the scanning apparatus is scanning the surface and the scanning apparatus comprises at least one of a radar device, a thermo-imaging device, an x-ray device, or any combination thereof.

7. The robotic system of claim 6, further comprising a machining tool disposed on the end effector and configured to machine the surface as the scanning apparatus is scanning the surface.

8. The robotic system of claim 1, wherein the end effector further comprises manual input features, onboard the end effector and configured to be manually manipulated to adjust a location of the end effector relative to the surface.

9. The robotic system of claim 1, wherein an angle of a beam generated by a proximity sensor, of the three or more proximity sensors, is angled not less than 15 degrees toward a central axis of the end effector.

10. The robotic system of claim 1, wherein an angle of a beam generated by a proximity sensor, of the three or more proximity sensors, is angled not less than 1 degrees toward a central axis of the end effector and not greater than 15 degrees toward the central axis of the end effector.

11. A system for inspecting a part, the system comprising:

a surface to be inspected; and a robotic system, comprising:

a robot comprising an articulating arm and an end effector coupled to the articulating arm;

three or more proximity sensors coupled to a base of the end effector and spaced apart from each other, wherein each one of the three or more proximity sensors is configured to generate a beam and detect a measured distance from the proximity sensor to the surface, such that the end effector is continuously displaced from the surface;

a scanning apparatus disposed on the base of the end effector, displaced from the surface, and configured to scan the surface when displaced from the surface;

three or more actuators on the base of the end effector, wherein each one of the three or more actuators couples a corresponding one of the three or more proximity sensors to the base of the end effector, and each one of the three or more actuators is actuatable, relative to any other one of the three or more actuators, to adjust an orientation of the corresponding one of the three or more proximity sensors relative to the base, such that an angle of the beam generated by the corresponding one of the three or more proximity sensors is adjusted relative to the base; and a controller configured to:

receive measured distances from at least three proximity sensors of the three or more proximity sensors;

actuate at least one of the three or more actuators and adjust the angle of the beam generated by the at least one of the three or more actuators relative to the base in response to the measured distances;

orient the end effector to a predetermined orientation based on the measured distances;

after orienting the end effector to the predetermined orientation, calculate an average of the measured distances from each of the at least three proximity sensors;

move the end effector to a predetermined operating distance from the surface based on the average of the measured distances, the predetermined operating distance correlating with the distance of the scanning apparatus relative to the surface to maintain displacement of the scanning apparatus from the surface; and direct movement of the end effector to follow a scanning pattern along the surface, wherein as the end effector is following the scanning pattern, the controller is further configured to:

determine when the average of the measured distances from the at least three proximity sensors is outside an allowable average-distance tolerance from the surface; and automatically move, the end effector to the predetermined operating distance when the average of the measured distances is determined to be outside of the allowable average-distance tolerance.

12. The system of claim 11, wherein the controller is further configured to orient the end effector to a perpendicular orientation, normal to the surface, based on the measured distance from each of the three or more proximity sensors.

13. The system of claim 11, wherein the controller is further configured to:

move the end effector to a position, wherein the position comprises a position in which:

the scanning apparatus is displaced from the surface; and the end effector is oriented in a perpendicular orientation, normal to a target location of the surface, and displaced from the target location of the surface; and direct movement of the end effector to follow a scanning pattern along the surface beginning at the target location, wherein, as the end effector is following the scanning pattern, the controller is configured to:

determine when a measured distance from at least one of the three or more proximity sensors is outside an allowable distance tolerance; and automatically reorient the end effector to the predetermined orientation when the measured distance from the at least one of the three or more proximity sensors is determined to be outside of the allowable distance tolerance.

14. The system of claim 11, wherein the three or more proximity sensors are spaced apart from each other on the end effector and comprise a first set of proximity sensors and a second set of proximity sensors wherein:

the first set of proximity sensors comprises two proximity sensors that are opposite each other on the end effector and spaced apart at a first length from each other;

the second set of proximity sensors comprises two other proximity sensors, that are opposite each other on the end effector and spaced apart at a second length from each other; and the first length and the second length are equal; and each proximity sensor of the at least three proximity sensors is configured to emit a beam and receive a reflected beam corresponding to the beam, the reflected beam being reflected off of the surface.

15. The system of claim 11, wherein the end effector further comprises manual input features, onboard the end effector and configured to be manually manipulated to adjust a location of the end effector relative to the surface.

16. A method of inspecting a part, the method comprising steps of:

moving an end effector, via an articulating arm of a robot, relative to a target location on a surface;

detecting a measured distance from the target location on the surface to each one of three or more proximity sensors coupled to a base of the end effector and spaced apart from each other;

in response to the measured distance, adjusting an orientation of at least one of the three or more proximity sensors, relative to the base of the end effector and relative to any other one of the three or more proximity sensors, by actuating a corresponding one of three or more actuators coupling the three or more proximity sensors to the base, so that an angle of a beam generated by each one of the at least one of the three or more proximity sensors is adjusted relative to the base;

orienting the end effector at a predetermined orientation based on the measured distances;

after orientating the end effector to the predetermined orientation, calculating an average of the measured distances from each of the three or more proximity sensors;

moving the end effector to a predetermined distance from the surface based on the average of the measured distances, the predetermined operating distance correlating with a distance between the surface and a scanning apparatus disposed on the end effector to maintain a displacement of the scanning apparatus from the surface;

directing movement of the end effector to follow a scanning pattern along the surface;

as the end effector is following the scanning pattern, determining when the average of the measured distances from the three or more proximity sensors is outside an allowable average-distance tolerance from the surface; and as the end effector is following the scanning pattern, automatically moving the end effector to the predetermined operating distance when the average of the measured distances is determined to be outside of the allowable average-distance tolerance.

17. The method of claim 16, wherein the step of moving the end effector, via the articulating arm of the robot, further comprises manipulating manual input features, onboard the end effector, to adjust a location of the end effector relative to the surface, such that beams generated from the three or more proximity sensors align with the target location on the surface.

18. The method of claim 16, further comprising steps of:

maintaining the end effector at the predetermined orientation and the predetermined operating distance as the surface is moved relative to the end effector;

determining when a measured distance from at least one of the three or more proximity sensors is outside an allowable distance tolerance; and automatically reorienting the end effector to the predetermined orientation when the measured distance from the at least one of the three or more proximity sensors is determined to be outside of the allowable distance tolerance.

19. The method of claim 16, further comprising the step of scanning the surface to detect anomalies in the surface, via the scanning apparatus.

20. The method of claim 16, wherein individually adjusting the angle of the beam comprises adjusting the angle of the beam such that the angle moves from being parallel to a central axis of the end effector to being angled toward the central axis of the end effector.

* * * * *